(12) United States Patent
Naota

(10) Patent No.: US 11,310,369 B2
(45) Date of Patent: Apr. 19, 2022

(54) ELECTRONIC APPARATUS AND COMPUTER READABLE RECORDING MEDIUM STORING GUIDANCE NOTIFICATION PROGRAM

(71) Applicant: KYOCERA Document Solutions Inc., Osaka (JP)

(72) Inventor: Tomonori Naota, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/654,170

(22) Filed: Oct. 16, 2019

(65) Prior Publication Data

US 2020/0128136 A1 Apr. 23, 2020

(30) Foreign Application Priority Data

Oct. 23, 2018 (JP) .............................. JP2018-198950

(51) Int. Cl.
*H04N 1/32* (2006.01)
*H04N 1/00* (2006.01)

(52) U.S. Cl.
CPC ..... *H04N 1/00029* (2013.01); *H04N 1/00037* (2013.01); *H04N 1/00074* (2013.01); *H04N 1/32625* (2013.01); *H04N 2201/0094* (2013.01)

(58) Field of Classification Search
CPC .......... H04N 1/00029; H04N 1/00037; H04N 1/00074; H04N 1/00084; H04N 1/32625; H04N 1/32635; H04N 1/32662; H04N 2201/0094; G06F 3/1234; G06F 3/1293; G06F 3/1294; G06F 3/1296; G06F 3/1285; G06F 3/1261; G06F 3/121; G06F 11/0733; G06F 11/0766; G06F 11/0793
USPC .......... 358/1.1, 1.11–1.18, 400–406, 1.9, 2.1
See application file for complete search history.

(56) References Cited

U.S. PATENT DOCUMENTS

| | | | | |
|---|---|---|---|---|
| 2007/0047454 | A1* | 3/2007 | Fujii ..................... | G06F 3/1234 370/245 |
| 2009/0132589 | A1* | 5/2009 | Daos ....................... | H04L 43/16 |
| 2015/0181065 | A1* | 6/2015 | Aizono .................. | G06Q 20/40 358/1.14 |
| 2015/0249771 | A1* | 9/2015 | Young ................... | G06F 3/1234 358/1.14 |
| 2016/0054866 | A1* | 2/2016 | Miyamoto ............ | H04L 67/125 715/709 |
| 2017/0013142 | A1* | 1/2017 | Kawaguchi ........ | H04N 1/00037 |
| 2018/0136805 | A1* | 5/2018 | Qu ...................... | H04N 1/00129 |

FOREIGN PATENT DOCUMENTS

JP 2018-079587 5/2018

OTHER PUBLICATIONS

SIPO, Office Action of Application No. 201910987367.X, dated Jun. 3, 2021.
SIPO, Office Action of CN 201910987367.X dated Jan. 5, 2022.

* cited by examiner

*Primary Examiner* — Chad Dickerson
(74) *Attorney, Agent, or Firm* — Lex IP Meister, PLLC

(57) ABSTRACT

When a multifunction peripheral (MFP) that notifies guidance indicating how to resolve an abnormal state that occurs in itself detects the abnormal state, the MFP notifies a log-in user of the MFP of guidance according to the combination of the detected abnormal state and authority of the log-in user of the MFP.

8 Claims, 7 Drawing Sheets

21 GUIDANCE

| PART (21a) | PART (21b) | . . . |

22 GUIDANCE LIST

| ABNORMAL STATE | AUTHORITY OF USER | IDENTIFICATION INFORMATION OF GUIDANCE |
|---|---|---|
| JAM OF RECORDING MEDIUM AT POSITION XXX | AUTHORITY OF GENERAL USER | ID001_1 |
| | AUTHORITY OF APPARATUS ADMINISTRATOR | ID002_2 |
| | AUTHORITY OF SERVICE PERSON | ID003_3 |
| . . . | . . . | . . . |

…

ELECTRONIC APPARATUS AND COMPUTER READABLE RECORDING MEDIUM STORING GUIDANCE NOTIFICATION PROGRAM

INCORPORATION BY REFERENCE

This application is based upon, and claims the benefit of priority from, corresponding Japanese Patent Application No. 2018-198950 filed in the Japan Patent Office on Oct. 23, 2018, the entire contents of which are incorporated herein by reference.

BACKGROUND

Field of the Invention

The present disclosure relates to an electronic apparatus and a guidance notification program for notifying guidance indicating a method for resolving an abnormal state occurring in the apparatus itself.

Description of Related Art

There has been known an electronic apparatus for notifying guidance indicating a method for resolving an abnormal state occurring in itself.

SUMMARY

An electronic apparatus of the present disclosure provides guidance indicating how to resolve an abnormal state that occurs in the electronic device, and includes an abnormal state detection unit that detects the abnormal state, and a notification execution unit that executes a notification to a log-in user of the electronic device. The notification execution unit notifies guidance according to a combination of the abnormal state detected by the abnormal state detection unit and authority of the log-in user of the electronic device.

A non-transitory computer-readable recording medium of the present disclosure stores a guidance notification program for causing an electronic device to provide guidance indicating how to resolve an abnormal state occurring in the electronic device, the guidance notification program causes a computer included in the electronic device to implement an abnormal state detection unit that detects the abnormal state, and a notification execution unit that executes a notification to a log-in user of the electronic device. The notification execution unit notifies guidance according to a combination of the abnormal state detected by the abnormal state detection unit and authority of the log-in user of the electronic device.

BRIEF DESCRIPTION OF THE DRAWINGS

FIG. 4 is a flowchart showing a partial operation of the MFP in FIG. 1 in a case where a general user logs in;

FIG. 6 is a flowchart showing a partial operation of the MFP in FIG. 1 in a case where an apparatus administrator logs in;

FIG. 8 is a flow chart showing an operation of the MFP in FIG. 1 in a case where a service person logs in.

DETAILED DESCRIPTION

Hereinafter, embodiments of the present disclosure will be described with reference to the drawings.

A structure of a multifunction peripheral (MFP) as an electronic apparatus according to an embodiment of the present disclosure will be described.

Figure 1:
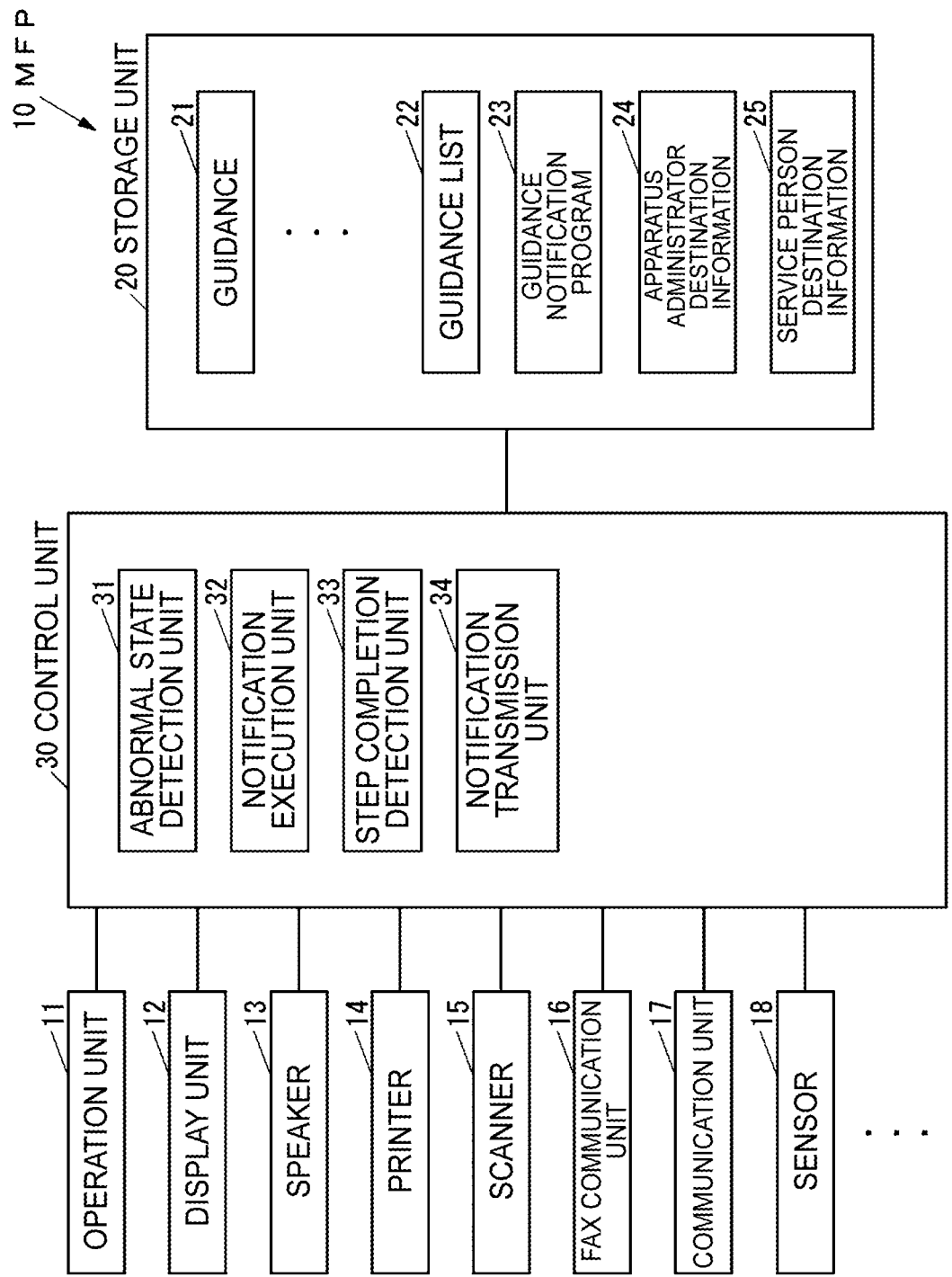
FIG. 1 is a block diagram of a multifunction peripheral (MFP) according to an embodiment of the present disclosure.

FIG. 1 is a block diagram of the MFP 10 according to the present embodiment.

As shown in FIG. 1, the MFP 10 includes an operation unit 11 which is an input device such as a button for inputting various operations, a display unit 12 that is a display device such as a liquid crystal display (LCD) for displaying various information, a speaker 13 which is an audio output device for outputting audio, a printer 14 that is a printing device for printing an image on a recording medium such as paper, and a scanner 15 which is a reading device that reads an image from a document. The MFP 10 further includes a facsimile communication unit 16 that is a facsimile device that performs facsimile communication with an external facsimile apparatus (not shown) via a communication line such as a public telephone line, and a communication unit 17 that is a communication device that communicates with an external device via a network such as a local area network (LAN) and the Internet, or directly through a wired or wireless connection without intervening the network.

The MFP 10 includes a sensor 18 for detecting a specific state of the MFP 10. The MFP 10 may also include at least one sensor for detecting a specific state of the MFP 10 in addition to the sensor 18. The states of the MFP 10 that can be detected by the sensors included in the MFP 10 include, for example, a presence/absence state of a recording medium at a specific location in a conveyance path not shown in the MFP 10, an opening/closing state of a specific door not shown in the MFP 10, an arrangement state of a member not shown in the MFP 10, a fixed state of a member not shown in the MFP 10, and a temperature state of a member not shown in the MFP 10.

The MFP 10 includes a storage unit 20, which is a nonvolatile storage device such as a semiconductor memory and a hard disk drive (HDD), for storing various kinds of information, and a control unit 30 for controlling the entire MFP 10.

The storage unit 20 stores guidance 21 indicating a method for resolving an abnormal state occurring in the MFP 10. The storage unit 20 may also store guidance indicating a method for resolving the abnormal state occurring in the MFP 10 in addition to the guidance 21. The guidance stored in the storage unit 20 is prepared in accordance with the abnormal state occurring in the MFP 10. Further, the guidance stored in the storage unit 20 is prepared according to an authority of a user depending on the abnormal state occurring in the MFP 10. The expression form of the guidance stored in the storage unit 20 includes various forms such as a moving image, a slide show, and sound.

The authority of the user of the MFP 10 includes authority of a general user, authority of an apparatus administrator who is a user who manages the MFP 10, and authority of a service person who maintains the MFP 10.

Figures 2, 3:
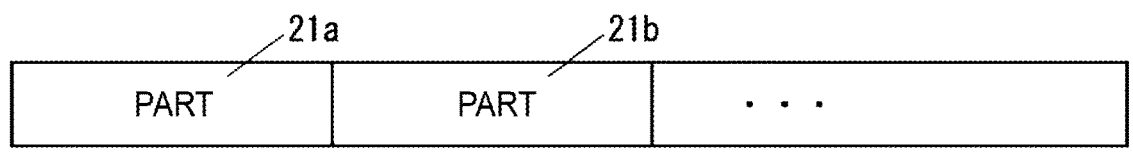
FIG. 2 is a diagram showing an example of guidance shown in FIG. 1.
FIG. 3 is a diagram showing an example of guidance list shown in FIG. 1.

FIG. 2 is a diagram showing an example of the guidance 21.

When the method of resolving the abnormal state corresponding to the guidance 21 includes a plurality of steps, the guidance 21 in FIG. 2 includes a part 21*a* as a first step and a part 21*b* as a second step following the first step, which are included in the method of resolving. It should be noted that when the method of resolving the abnormal state corresponding to the guidance 21 includes three or more steps, the guidance 21 also includes parts that are the third and subsequent steps from the beginning, similar to the part 21*b* that is the second step from the beginning. That is, the guidance 21 includes a part for each step.

As shown in FIG. 1, the storage unit 20 stores a guidance list 22 showing a list of guidance stored in the storage unit 20.

FIG. 3 is a diagram illustrating an example of the guidance list 22.

The guidance list 22 in FIG. 3 associates a combination of the abnormal state occurring in the MFP 10 with the authority of each user, and identification information of the guidance.

Depending on the abnormal state occurring in the MFP 10, the apparatus administrator can execute a resolving method other than the resolving method which can be executed by the general user. Similarly, depending on the abnormal state occurring in the MFP 10, the service person can execute a resolving method other than the resolving method which can be executed by the apparatus administrator.

As shown in FIG. 1, the storage unit 20 stores a guidance notification program 23 causing the MFP 10 to provide the guidance. The guidance notification program 23 may be installed in the MFP 10 at the manufacturing stage of the MFP 10, for example. Also, the guidance notification program 23 may be additionally installed in the MFP 10 from an external storage medium such as a universal serial bus (USB) memory, or through the network.

The storage unit 20 stores apparatus administrator destination information 24 indicating the destination of the apparatus administrator of the MFP 10, and service person destination information 25 indicating the destination of the service person of the MFP 10.

The control unit 30 includes, for example, a central processing unit (CPU), a read only memory (ROM) storing a program and various data, and a random access memory (RAM) as a memory used as a work area of the CPU of the control unit 30. The CPU of the control unit 30 executes programs stored in the ROM of the storage unit 20 or the control unit 30.

The control unit 30 includes an abnormal state detection unit 31 for detecting the abnormal state occurring in the MFP 10, a notification execution unit 32 for performing a notification to the log-in user of the MFP 10, a step completion detection unit 33 for detecting the completion of the steps in the method of resolving the abnormal state occurring in the MFP 10, and a notification transmission unit 34 for transmitting a notification to a specific destination.

Next, an operation of the MFP 10 will be described.

First, an operation of the MFP 10 when the general user has logged in will be described.

Figure 4:
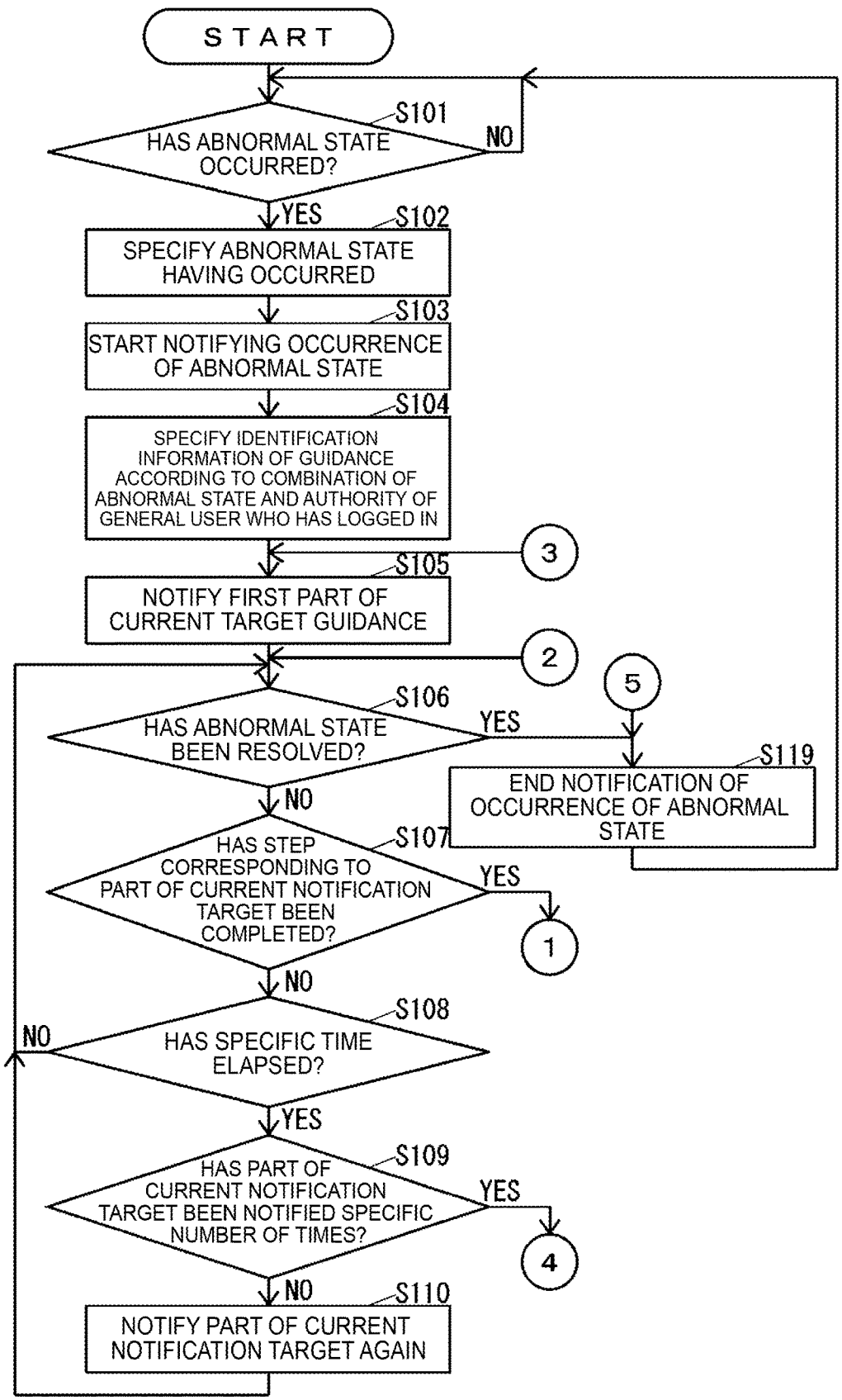
Figure 5:
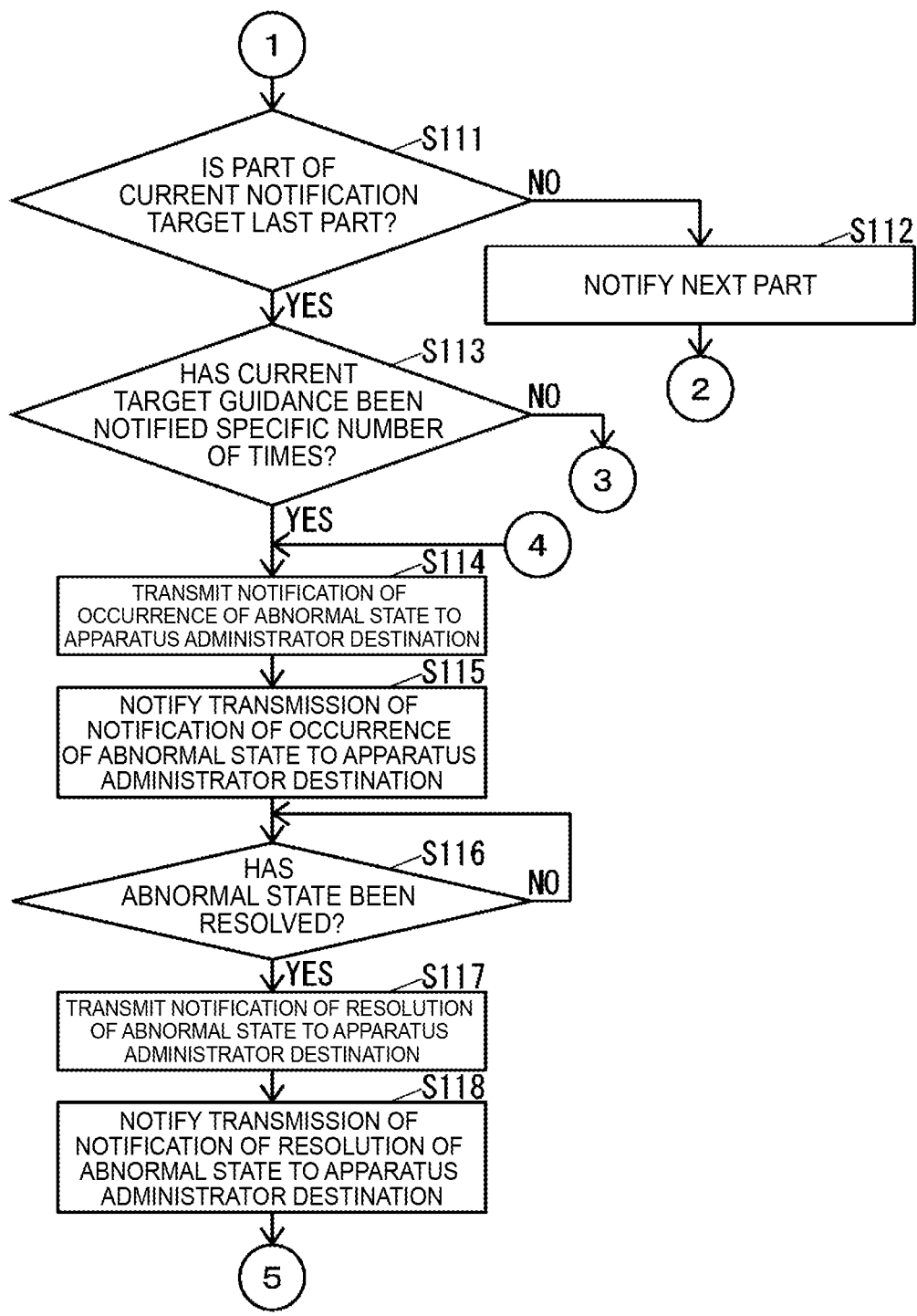
FIG. 5 is a flowchart following the flowchart shown in FIG. 4.

FIGS. 4 and 5 are flowcharts showing an operation the MFP 10 when the general user has logged in.

When the general user logs in the MFP 10, the control unit 30 executes the operation shown in FIGS. 4 and 5 until the general user logs out of the MFP 10.

As shown in FIGS. 4 and 5, the abnormal state detection unit 31 determines whether the abnormal state has occurred or not in the MFP 10 until the abnormal state detection unit 31 determines that the abnormal state has occurred in the MFP 10 based on detection results from the various sensors of the MFP 10 (S101).

When the abnormal state detection unit 31 determines in S101 that the abnormal state has occurred in the MFP 10, the abnormal state detection unit 31 identifies the abnormal state that has occurred in the MFP 10 based on detection results from the various sensors of the MFP 10 (S102). That is, the abnormal state detection unit 31 detects the abnormal state occurring in the MFP 10.

After the process of S102, the notification execution unit 32 starts to notify the occurrence of the abnormal state specified in S102 to the general user who logged in to the MFP 10 (S103). The notification method in S103 includes, for example, displaying on the display unit 12 and outputting sound through the speaker 13.

After the process of S103, the notification execution unit 32 specifies the identification information of the guidance based on the guidance list 22, in accordance with the combination of the abnormal state specified in S102 and the authority of the general user who logged in to the MFP 10 (S104).

Next, the notification execution unit 32 notifies the general user who logged in to the MFP 10 of the first part of the guidance identified by the identification information specified in S104 from the guidance stored in the storage unit 20 (hereinafter referred to as "current target guidance" in the operation of FIGS. 4 and 5) (S105). The notification method in S105 includes, for example, displaying on the display unit 12 and outputting sound through the speaker 13. The general user who logged in to the MFP 10 can execute an operation for resolving the abnormal state in which the notification of occurrence has started in S103, based on the guidance notified in S105.

After the process of S105, the abnormal state detection unit 31 determines whether the abnormal state specified in S102 has been resolved or not based on detection results from various sensors of the MFP 10 (S106).

When the abnormal state detection unit 31 determines in S106 that the abnormal state has not been resolved, the step completion detection unit 33 determines whether the part of the current notification target in the step of the current target guidance, that is, the step corresponding to the part notified in S105 has been completed or not, based on detection results from various sensors of the MFP 10 (S107).

When the step completion detection unit 33 determines in step S107 that the step corresponding to the part of the current notification target has not been completed, the notification execution unit 32 determines whether a specific time has elapsed or not after the process of S105 just before (S108).

When the notification execution unit 32 determines in S108 that the specific time has not elapsed, the abnormal state detection unit 31 executes the process of S106.

When the abnormal state detection unit 31 determines in S108 that the specific time has elapsed, the notification execution unit 32 determines whether the part of the current notification target has been notified a specific number of times or not after the process of S105 (S109).

When the notification execution unit 32 determines in S109 that the part of the current notification target has not been notified the specific number of times, the notification execution unit 32 notifies the general user who logged in to the MFP 10 of the part of the current notification target again (S110). The notification method in S110 includes, for example, displaying on the display unit 12 and outputting sound through the speaker 13. The general user who logged in to the MFP 10 can execute an operation for resolving the abnormal state in which the notification of occurrence has started in S103, based on the guidance notified in S110.

The abnormal state detection unit 31 executes the process of S106 after the process of S110.

When the step completion detection unit 33 determines in step S107 that the step corresponding to the part of the current notification target has been completed, the notification execution unit 32 determines whether the part of the current notification target is the last part of the current target guidance or not (S111).

When the notification execution unit 32 determines in S111 that the part of the current notification target is not the last part of the current target guidance, that is, there is a next step of the step corresponding to the part of the current notification target, the notification execution unit 32 notifies the general user who logged in to the MFP 10 of a part of the step following the step corresponding to the part of the current notification target of the part of the current target guidance, that is, the next part (S112). The notification method in S112 includes, for example, displaying on the display unit 12 and outputting sound through the speaker 13. The general user who logged in to the MFP 10 can execute an operation for resolving the abnormal state in which the notification of occurrence has been started in S103, based on the guidance notified in S112.

The abnormal state detection unit 31 executes the process of S106 after the process of S112.

When the notification execution unit 32 determines in S111 that the part of the current notification target is the last part of the current target guidance, the notification transmission unit 34 determines whether the current target guidance has been notified a specific number of times or not after the process of S103 just before (S113).

When the notification transmission unit 34 determines in S113 that the current target guidance has not been notified the specific number of times, the notification execution unit 32 executes the process of S105.

When the notification execution unit 32 determines in S109 that the part of the current notification target has been notified the specific number of times, or when the notification transmission unit 34 determines in S113 that the current target guidance has been notified the specific number of times, the notification transmission unit 34 transmits the notification of the occurrence of the abnormal state specified in S102 to the destination of the apparatus administrator indicated in the apparatus administrator destination information 24 (S114). Therefore, the apparatus administrator can recognize that the abnormal state has occurred in the MFP 10.

After the process of S114, the notification execution unit 32 notifies the general user who logged in to the MFP 10 of the transmission of the notification of the occurrence of the abnormal state to the destination of the apparatus administrator (S115). The notification method in S115 includes, for example, displaying on the display unit 12 and outputting sound through the speaker 13.

After the process of S115, the abnormal state detection unit 31 determines whether the abnormal state specified in S102 has been resolved or not based on detection results from various sensors of the MFP 10 until the abnormal state detection unit 31 determines that the abnormal state specified in S102 has been resolved (S116).

When the abnormal state detection unit 31 determines in S116 that the abnormal state has been resolved, the notification transmission unit 34 transmits the notification of the resolution of the abnormal state specified in S102 to the destination of the apparatus administrator indicated in the apparatus administrator destination information 24 (S117). Therefore, the apparatus administrator can recognize that the abnormal state occurred in the MFP 10 has been resolved.

After the process of S117, the notification execution unit 32 notifies the general user who logged in to the MFP 10 of the transmission of the notification of the resolution of the abnormal state to the destination of the apparatus administrator (S118). The notification method in S118 includes, for example, displaying on the display unit 12 and outputting sound through the speaker 13.

When the abnormal state detection unit 31 determines in S106 that the abnormal state has been resolved, or when the process of S118 ends, the notification execution unit 32 ends the notification of the occurrence of the abnormal state started in S103 (S119), and executes the process of S101.

Next, an operation of the MFP 10 when the apparatus administrator logs in will be described.

Figure 6:
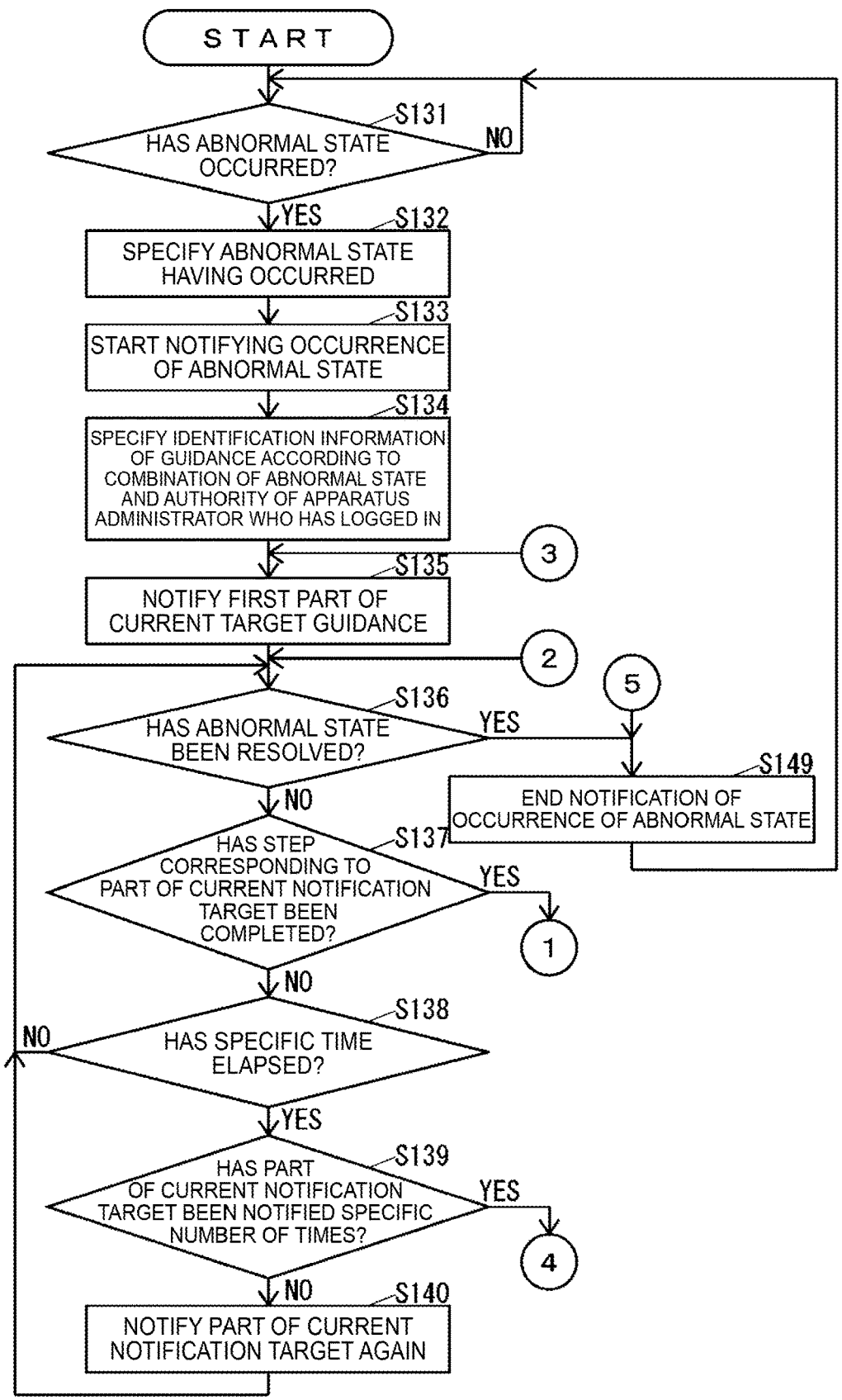
Figure 7:
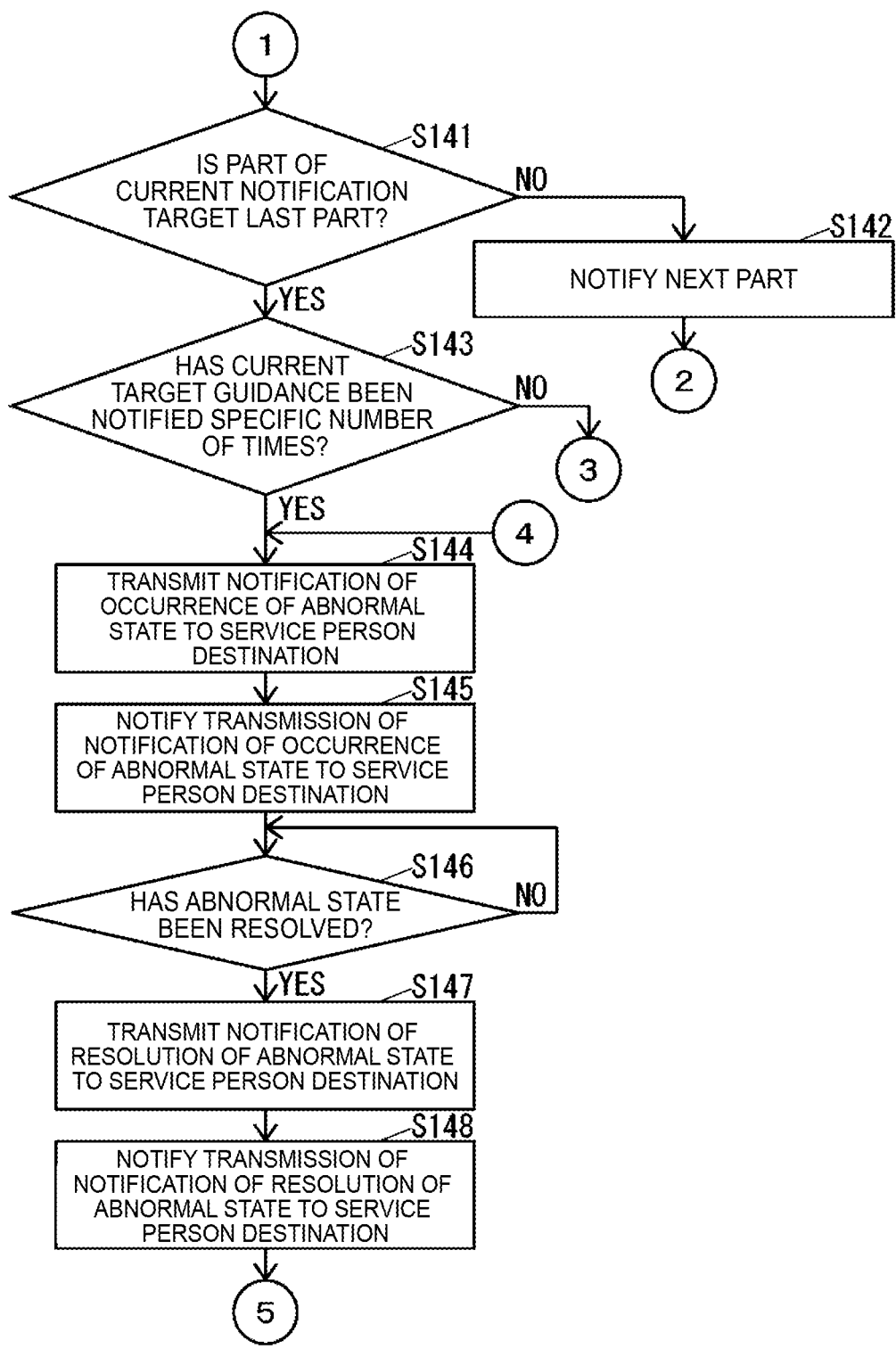
FIG. 7 is a flow chart following the flowchart shown in FIG. 6.

FIGS. 6 and 7 are flowcharts of an operation of the MFP 10 when the apparatus administrator logs in.

When the apparatus administrator logs in to the MFP 10, the control unit 30 executes the operation shown in FIGS. 6 and 7 until the apparatus administrator logs out of the MFP 10.

As shown in FIGS. 6 and 7, the control unit 30 executes the processes of S131 to S149 similar to the processes of S101 to S119 shown in FIGS. 4 and 5.

It should be noted that in the process of S134, the notification execution unit 32 specifies the guidance identification information according to the combination of the abnormal state specified in S132 and the authority of the apparatus administrator who has logged in to the MFP 10 based on the guidance list 22.

Also, in the process of S144, the notification transmission unit 34 transmits a notification of the occurrence of the abnormal state specified in S132 to the destination of the service person indicated in the service person destination information 25. Therefore, the service person can recognize that the abnormal state has occurred in the MFP 10.

Further, in the process of S145, the notification execution unit 32 notifies the apparatus administrator who logged in to the MFP 10 of the transmission of the notification of the occurrence of the abnormal state to the destination of the service person. The notification method in S145 includes, for example, displaying on the display unit 12 and outputting sound through the speaker 13.

In the process of S147, the notification transmission unit 34 transmits the notification of the resolution of the abnormal state specified in S132 to the destination of the service person indicated in the service person destination information 25. Therefore, the service person can recognize that the abnormal state occurred in the MFP 10 has been resolved.

In the process of S148, the notification execution unit 32 notifies the apparatus administrator who logged in to the MFP 10 of the transmission of the notification of the resolution of the abnormal state to the destination of the service person. The notification method in S148 includes, for example, displaying on the display unit 12 and outputting sound through the speaker 13.

Next, an operation of the MFP 10 when the service person logs in will be described.

Figure 8:
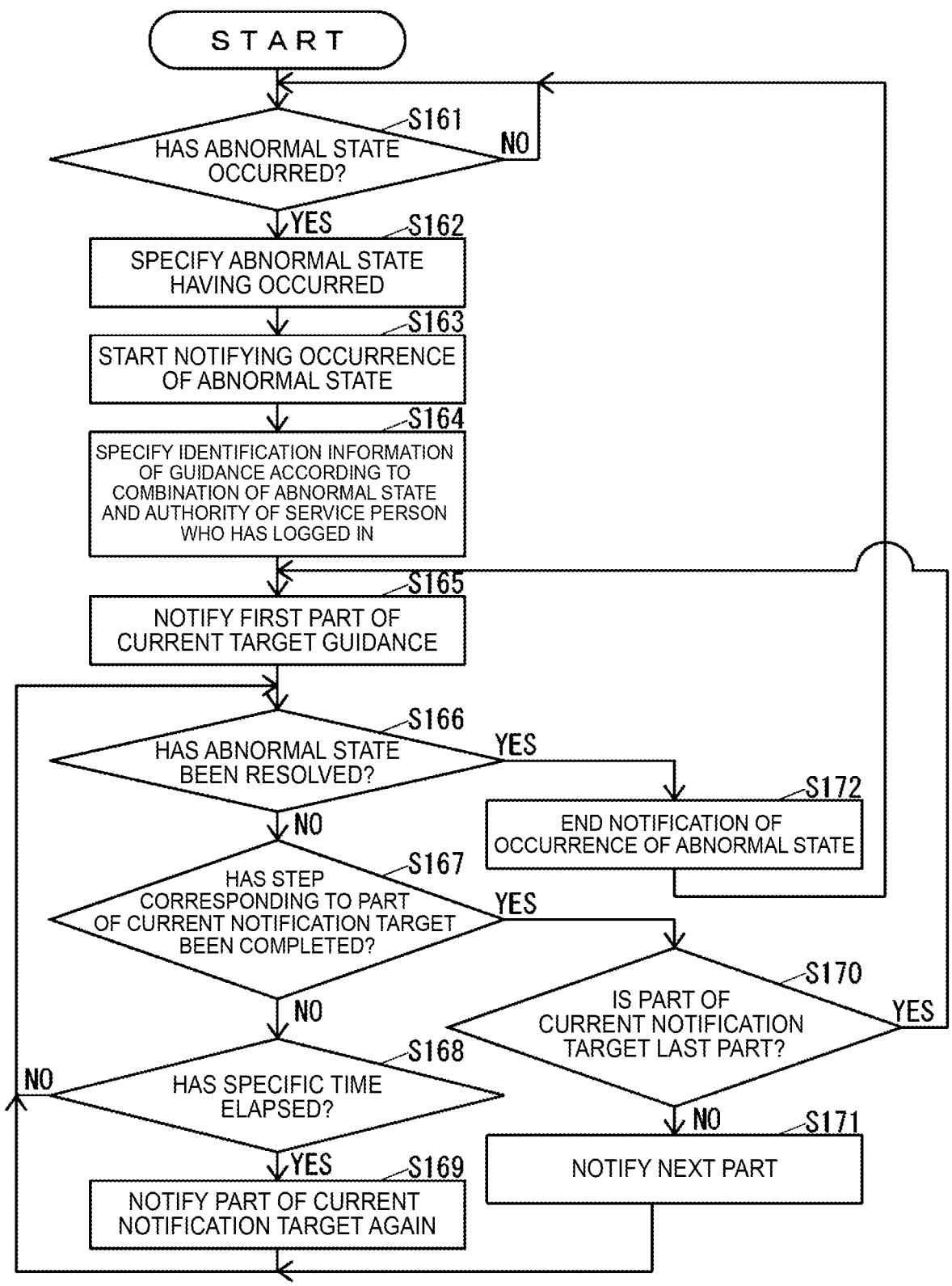

FIG. 8 is a flowchart showing an operation of the MFP 10 when the service person logs in.

When the service person logs in to the MFP 10, the control unit 30 executes the operation illustrated in FIG. 8 until the service person logs out of the MFP 10.

As shown in FIG. 8, the control unit 30 executes the processes of S161 to S164 similar to the processes of S101 to S104 (see FIG. 4).

It should be noted that in the process of S164, the notification execution unit 32 specifies the guidance identification information according to the combination of the abnormal state specified in S162 and the authority of the service person logged in to the MFP 10 based on the guidance list 22.

After the process of S164, the control unit 30 executes the processes of S165 to S168 similar to the processes of S105 to S108 (see FIG. 4).

When the notification execution unit 32 determines in S168 that the specific time has elapsed, the notification execution unit 32 notifies the service person who logged in to the MFP 10 of the part of the current notification target again (S169). The notification method in S169 includes, for example, displaying on the display unit 12 and outputting sound through the speaker 13. The service person who logged in to the MFP 10 can execute an operation for resolving the abnormal state in which the notification of occurrence is started in S163, based on the guidance notified in S169.

The abnormal state detection unit 31 executes the process of S166 after the process of S169.

When the step completion detection unit 33 determines in step S167 that the step corresponding to the part of the current notification target has been completed, the notification execution unit 32 determines whether the part of the current notification target is the last part of the current target guidance or not (S170).

When the notification execution unit 32 determines in S170 that the part of the current notification target is not the last part of the current target guidance, the notification execution unit 32 notifies the service person who logged in to the MFP 10 of a part next to the part of the current notification target of the part of the current target guidance (S171). The notification method in S171 includes, for example, displaying on the display unit 12 and outputting sound through the speaker 13. The service person who logged in to the MFP 10 can execute an operation for resolving the abnormal state in which the notification of occurrence is started in S163, based on the guidance notified in S171, The abnormal state detection unit 31 executes the process of S166 after the process of S171.

When the notification execution unit 32 determines in S170 that the part of the current notification target is the last part of the current target guidance, the notification execution unit 32 executes the process of S165.

When the abnormal state detection unit 31 determines in S166 that the abnormal state has been resolved, the notification execution unit 32 ends the notification of the occurrence of the abnormal state started in S163 (S172), and executes the process of S161.

As described above, the MFP 10 notifies the guidance according to the combination of the abnormal state that has occurred in the MFP 10 and the authority of the user who logged in to the MFP 10 ("S104, S105, S110 and S112", "S134, S135, S140 and S142" or "S164, S165, S169 and S171"). Therefore, the MFP 10 can notify the guidance suitable for the user.

When the guidance is notified the specific number of times (YES in S113 or YES in S143) and when the resolution of the abnormal state corresponding to the guidance is not detected (NO in S106 or NO in S136), as a method of resolving the abnormal state, the MFP 10 transmits the notification of the occurrence of the abnormal state to a destination of a specific user who can execute a resolving method other than the resolving method that can be executed by the log-in user of the MFP 10 (S114 or S144). Therefore, according to the present embodiment, it is not necessary for the log-in user of the MFP 10 to notify the specific user that the abnormal state has occurred in the MFP 10. Accordingly, the embodiment can improve convenience.

When the part of the specific step in the guidance is notified the specific number of times (YES in S109 or YES in S139), and when the completion of the step is not detected (NO in S107 or NO in S137), as the method of resolving the abnormal state corresponding to the guidance, the MFP 10 transmits a notification of the occurrence of the abnormal state to a destination of the specific user who can execute a resolving method other than the resolving method that can be executed by the log-in user of the MFP 10 (S114 or S144). Therefore, according to the present embodiment, it is not necessary for the log-in user of the MFP 10 to notify the specific user that the abnormal state has occurred in the MFP 10. Accordingly, the embodiment can improve convenience.

When the notification of the occurrence of the abnormal state is transmitted to the destination of the specific user (S114 or S144), the MFP 10 notifies the log-in user of the MFP 10 that the notification of the occurrence of the abnormal state has been transmitted to the destination of the specific user (S115 or S145). Therefore, the log-in user of the MFP 10 can recognize that the log-in user of the MFP 10 does not need to notify the specific user that the abnormal state has occurred in the MFP 10. Accordingly, the embodiment can improve convenience.

After the notification of the occurrence of the abnormal state is transmitted to the destination of the specific user (S114 or S144), when the resolution of the abnormal state whose occurrence has been notified (YES in S116 or YES in S146), the MFP 10 transmits the notification of the resolution in the abnormal state to the destination (S117 or S147). Therefore, it is not necessary for the log-in user of the MFP 10 to notify the specific user that the notified abnormal state has been resolved. Accordingly, the embodiment can improve convenience.

Although the electronic apparatus of the present disclosure is an MFP in the embodiment, the electronic apparatus may be an image forming apparatus other than the MFP, such as a printer dedicated apparatus, a copy dedicated apparatus, a facsimile dedicated apparatus, and a scanner dedicated apparatus, or an electronic apparatus other than the image forming apparatus, such as a personal computer (PC).

What is claimed is:

1. An electronic device that provides guidance indicating a method for resolving an abnormal state that occurs in the electronic device, comprising:
   a controller including:
      an abnormal state detection unit that detects the abnormal state; and
      a notification execution unit that executes a notification to a logged-in user of the electronic device; and
   a memory that stores a guidance list which includes a plurality of combinations each of which associates the abnormal state with a plurality of different authorities of users of the electronic device, and a plurality of pieces of guidance which are assigned respectively to the plurality of different authorities included in each of the plurality of combinations, wherein the controller effects control to cause the notification execution unit to specify the guidance assigned to an authority of the logged-in user of the electronic device from among the plurality of pieces of guidance included in a combination which includes the abnormal state detected by the abnormal state detection unit, by using the guidance list stored in the memory and notify the specified guidance.

2. The electronic device according to claim 1, wherein the controller further includes a notification transmission unit that transmits a notification to a specific destination, and wherein when the notification execution unit notifies the guidance a specific number of times and the abnormal state detection unit does not detect resolution of the abnormal state corresponding to the guidance as a notification target notified by the notification execution unit, the notification transmission unit transmits a notification of occurrence of the abnormal state to a destination of a specific user who can execute a resolving method other than a resolving method that can be executed by the logged-in user of the electronic device, as a method for the resolution of the abnormal state corresponding to the guidance as a notification target notified by the notification execution unit.

3. The electronic device according to claim 2, wherein the method of resolving the abnormal state comprises a plurality of steps, wherein the controller further includes a step completion detection unit that detects completion of a step, wherein the guidance comprises a part for each step, wherein the notification execution unit notifies the guidance by each part, wherein when the step completion detection unit detects completion of a step corresponding to a part of a current notification target and there is a step following the step corresponding to the part of the current notification target, the notification execution unit notifies a part for the step following the step corresponding to the part of the current notification target, and wherein when the notification execution unit notifies a part for a specific step a specific number of times and the step completion detection unit does not detect completion of the specific step, the notification transmission unit transmits the notification of the occurrence of the abnormal state to the destination of the specific user.

4. The electronic device according to claim 2, wherein when the notification transmission unit transmits the notification of the occurrence of the abnormal state to the destination of the specific user, the notification execution unit notifies transmission of the notification of the occurrence of the abnormal state to the destination of the specific user.

5. The electronic device according to claim 2, wherein when, after the notification transmission unit transmits the notification of the occurrence of the abnormal state, the abnormal state detection unit detects the resolution of the abnormal state, whose occurrence has been notified, the notification transmission unit transmits a notification of the resolution of the abnormal state to a destination to which the notification of the occurrence of the abnormal state has been transmitted.

6. A non-transitory computer-readable recording medium storing a guidance notification program for causing an electronic device to provide guidance indicating a method for resolving an abnormal state occurring in the electronic device, the guidance notification program causing a computer included in the electronic device to implement:

detecting the abnormal state; and executing a notification to a logged-in user of the electronic device, wherein the executing the notification includes specifying the guidance assigned to an authority of the logged-in user of the electronic device from among a plurality of pieces of guidance included in a combination which includes the detected abnormal state, by using a guidance list which is stored in a memory of the electronic device and includes a plurality of combinations each of which associates the abnormal state with a plurality of different authorities of users of the electronic device, and the plurality of pieces of guidance which are assigned respectively to the plurality of different authorities included in each of the plurality of combinations, and notifying the specified guidance.

7. The electronic device according to claim 1, wherein the guidance list includes identification information of each of the plurality of pieces of guidance, and wherein the controller specifies the guidance associated with the combination by specifying the identification information of the guidance associated with the combination and specifying the guidance identified by the specified identification information.

8. The non-transitory computer-readable recording medium according to claim 6, wherein the guidance list includes identification information of each of the plurality of pieces of guidance, and wherein the specifying the guidance associated with the combination includes specifying the identification information of the guidance associated with the combination and specifying the guidance identified by the specified identification information.

* * * * *